(12) United States Patent
Bond et al.

(10) Patent No.: US 7,478,373 B2
(45) Date of Patent: *Jan. 13, 2009

(54) KERNEL EMULATOR FOR NON-NATIVE PROGRAM MODULES

(75) Inventors: Barry Bond, Maple Valley, WA (US); Atm Shafiqul Khalid, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 445 days.

This patent is subject to a terminal disclaimer.

(21) Appl. No.: 11/016,630

(22) Filed: Dec. 17, 2004

(65) Prior Publication Data

US 2005/0102129 A1    May 12, 2005

Related U.S. Application Data

(63) Continuation of application No. 09/847,535, filed on May 1, 2001.

(60) Provisional application No. 60/244,410, filed on Oct. 30, 2000.

(51) Int. Cl.
*G06F 9/45* (2006.01)

(52) U.S. Cl. .................. 717/138; 717/125; 717/141; 712/41; 703/27

(58) Field of Classification Search .................. 712/41; 703/27; 717/125, 141
See application file for complete search history.

(56) References Cited

U.S. PATENT DOCUMENTS

| | | | |
|---|---|---|---|
| 4,638,423 A | 1/1987 | Ballard | |
| 4,742,447 A | 5/1988 | Duvall et al. | |
| 4,992,931 A | 2/1991 | Hirasawa | |
| 5,036,484 A | 7/1991 | McCoy et al. | |
| 5,132,898 A | 7/1992 | Sakamura et al. | |
| 5,255,379 A | 10/1993 | Melo | |
| 5,307,504 A * | 4/1994 | Robinson et al. | 712/41 |
| 5,339,422 A * | 8/1994 | Brender et al. | 714/4 |
| 5,499,380 A | 3/1996 | Iwata et al. | |
| 5,560,013 A | 9/1996 | Scalzi et al. | |

(Continued)

FOREIGN PATENT DOCUMENTS

EP    0 372 835 A2    6/1990

(Continued)

OTHER PUBLICATIONS

Michael Franz, "Emulating an Operating System on Top of Another," Software—Practice and Experience, vol. 23, No. 6, Jun. 1993, pp. 677-692.

(Continued)

*Primary Examiner*—Wei Y Zhen
*Assistant Examiner*—Phillip H Nguyen
(74) *Attorney, Agent, or Firm*—Lee & Hayes, PLLC

(57) ABSTRACT

Described herein is a technology facilitating the operation of non-native program modules within a native computing platform. This invention further generally relates to a technology facilitating the interoperability of native and non-native program modules within a native computing platform. More specifically, this technology involves an emulation of the kernel of the non-native operating system. Instead of interacting with the native kernel of the native computing platform, the non-native program modules interact with a non-native kernel emulator. This abstract itself is not intended to limit the scope of this patent. The scope of the present invention is pointed out in the appending claims.

6 Claims, 6 Drawing Sheets

U.S. PATENT DOCUMENTS

| | | | |
|---|---|---|---|
| 5,617,554 A | 4/1997 | Alpert et al. | |
| 5,623,617 A * | 4/1997 | Davidian | 712/227 |
| 5,632,028 A | 5/1997 | Thusoo et al. | |
| 5,652,876 A | 7/1997 | Ashe et al. | |
| 5,751,982 A | 5/1998 | Morley | |
| 5,761,477 A | 6/1998 | Wahbe et al. | |
| 5,768,593 A * | 6/1998 | Walters et al. | 717/141 |
| 5,796,989 A | 8/1998 | Morley et al. | |
| 5,802,373 A * | 9/1998 | Yates et al. | 717/139 |
| 5,842,017 A * | 11/1998 | Hookway et al. | 717/158 |
| 5,860,072 A | 1/1999 | Schofield | |
| 5,937,193 A * | 8/1999 | Evoy | 717/140 |
| 5,961,582 A | 10/1999 | Gaines | |
| 6,026,238 A | 2/2000 | Bond et al. | |
| 6,070,010 A | 5/2000 | Keenleyside et al. | |
| 6,091,897 A | 7/2000 | Yates et al. | |
| 6,199,202 B1 | 3/2001 | Coutant et al. | |
| 6,226,789 B1 * | 5/2001 | Tye et al. | 717/138 |
| 6,247,172 B1 * | 6/2001 | Dunn et al. | 717/141 |
| 6,269,409 B1 | 7/2001 | Solomon | |
| 6,363,409 B1 | 3/2002 | Hart et al. | |
| 6,385,567 B1 * | 5/2002 | Lew et al. | 703/27 |
| 6,513,057 B1 | 1/2003 | McCrory | |
| 6,845,508 B2 | 1/2005 | Parry | |
| 6,882,968 B1 | 4/2005 | Linden | |
| 6,901,583 B1 | 5/2005 | Park | |
| 7,107,584 B2 | 9/2006 | Bond et al. | |

FOREIGN PATENT DOCUMENTS

| | | |
|---|---|---|
| EP | 0 571 683 A1 | 12/1993 |
| EP | 0645701 | 3/1995 |
| EP | 0737919 | 10/1996 |
| EP | 1 209 564 A2 | 5/2002 |
| WO | WO98/19238 | 5/1998 |
| WO | WO 99/31584 | 6/1999 |

OTHER PUBLICATIONS

Stephen T. Walker, "The advent of trusted* computer operating systems," AFIPS Conference Proceedings, 1980 National Computer Conference, May 19-22, 1980, Anaheim, CA USA, pp. 655-665.

Philip Dyer, "The Game Room," Macworld, vol. 16, No. 1, Jan. 1999, p. 190.

Richard Rashid, Robert Baron, Alessandro Forin, David Golub, Michael Jones, Daniel Julin, Douglas Orr, Richard Sanzi, Mach: A Foundation for Open Systems, Workstation Operating Systems: Proceedings of the Second Workshop on Workstation Operating Systems, Sep. 27-29.

"Method for Implementing an Emulation of UNIX Shared Memory System Calls in the OS/2 Operating System", IBM Technical Disclosure Bulletin, IBM Corporation, Dec. 1, 1993, pp. 151-152.

* cited by examiner (background)

(background)

KERNEL EMULATOR FOR NON-NATIVE PROGRAM MODULES

RELATED APPLICATIONS

This application stems from and claims priority to U.S. Provisional Application Ser. No. 60/244,410, titled "Kernel Emulator for Non-Native Program Modules" filed on Oct. 30, 2000, the disclosure of which is incorporated by reference herein. This application is a continuation of U.S. patent application Ser. No. 09/847,535, filed May 1, 2001, the disclosure of which is incorporated by reference herein.

TECHNICAL FIELD

This invention generally relates to a technology facilitating the operation of non-native program modules within a native computing platform. This invention further generally relates to a technology facilitating the interoperability of native and non-native program modules within a native computing platform.

BACKGROUND

Applications designed to run on a specific computing platform do not operate on a different computing platform. Generally, software is inextricably linked to the computing platform on which it is designed to operate. Software written and compiled to operate within minicomputer running a specific implementation of the Unix operating system will not function within a hand-held computer using a proprietary operating system.

A computing platform typically includes an operating system (OS) and computing hardware architecture. Examples of OSs include these Microsoft® operating systems: MS-DOS®, Windows® 2000, Windows NT® 4.0, Windows® ME, Windows® 98, and Windows® 95. Examples of computing hardware architecture include those associated with these Intel® microprocessors: 80286, Pentium®, Pentium® II, Pentium® III, and Itanium™.

Examples of computing platforms includes 16-bit platforms (such as Microsoft® MS-DOS® and Intel® 80286), 32-bit platforms (such as Microsoft® Windows® NT® and Intel® Pentium® II), and 64-bit platforms (such as Intel® Itanium™ and an appropriate 64-bit OS). A computing platform may also be called a platform, computing environment, or environment.

Specific versions of applications are designed to operate under a specific platform. These applications may be called "native" when they execute under their specific platform. For example, Microsoft® Office 2000 is an application designed to operate on 32-bit platform. In other words, Microsoft® Office® 2000 is a native application relative to its 32-bit platform. However, these 32-bit applications may be called "non-native" when they execute under a different platform, such as a 64-bit platform.

An example of a program-module target platform (or simply "target platform") is the platform an executable program (e.g., program module, application, program) was targeted to run. For a program module, its target platform is also its native platform. For example, if one builds a Microsoft® Office® application to run under Windows® 2000 32-bit X86 OS environment then for that image target platform would be 32-bit x86.

An application program is the primary example of a "program module" as the term is used herein. However, the term "program module" includes other executable software that may not be labeled an application.

Typical Computer Architecture

Typical computer architecture is multi-layered. From the bottom up, it includes the hardware layer, the operating system (OS) layer, and the application layer. Alternatively, these layers may be described as the hardware layer, the kernel mode layer, and the user mode layer.

FIG. 1 illustrates the layers of typical computer architecture 100. The top of the architecture is the user mode 110. It includes applications, such as applications 112a-e. These applications communicate with a set of APIs 120. Typically, this API set is considered part of the OS, and thus, part of the computing platform.

The next layer of the architecture is the kernel mode 130. This may be generally called the "kernel" of the OS. Since it is part of the OS, it is part of the computing platform.

A kernel of an OS is the privileged part of the OS—the most trusted part of the OS. It is an inner layer of code. It typically operates I/O 132, security 134, display control (i.e., access to the screen) 136, memory management 138, and other privileged functions 139. The kernel has sole access to the hardware in the hardware layer 150 via device drivers 142 and other hardware interfaces 144.

Kernel APIs 140 are those APIs within the kernel that arbitrate access to the kernel functions. The applications typically do not call the kernel directly. Instead, the applications call the APIs 120 and the APIs, in turn, may call the kernel (in particular the kernel APIs 140).

Although FIG. 1 does not show the components 132-144 of the kernel 130 with connections between them, these components are connected as is necessary. The coupling lines are omitted from the drawing for the sake of simplicity and clarity.

Below the kernel mode 130, there is the hardware layer 150. This layer includes all of the hardware of the actual computer. This includes the processor(s), memory, disk I/O, other I/O, etc. The platform also includes the hardware layer.

Therefore, a computing platform includes the hardware layer, the kernel layer, and typically the user-mode APIs 120.

Interoperability and Compatibility

Application compatibility has been big concern since computing platforms started evolving. People want to run desired applications in their chosen platform in the ideal world. However, in the real world, it's very difficult to run an application in a different host platform that it wasn't written for. For example, 32-bit x86 application cannot run on 64-bit Merced (IA64) environment. The problem becomes worse when people buy a more powerful machine with a different platform than they used to for a long time. Immediately all the applications in the old platform becomes useless unless they find some way to use that in the new environment.

Each platform has its corresponding body of native applications that are designed to run under it. When a new generation of platform is released, software developers generally upgrade their products to run under the new generation platform. Software developers do this for many reasons, including marketing, technology, and economics.

For similar reasons, OS developers wish to make their products backwards compatible. In this way, older generations of applications may run on the latest generation of the OS (and thus the latest generation of platform). In other words, if non-native applications can run under a native platform (including the new OS), this encourages users to purchase the new OS because they are not forced to discard their current applications and purchase new versions. This also gives software developers time to develop upgrades to their applications.

Herein, an example of compatibility is a non-native program module functioning appropriately and peacefully coexisting with native program modules within a native computing environment (e.g., an OS).

As used herein, an example of interoperability is the ability of both native and non-native program modules to share resources (such as access data within each other's memory space or a shared memory space) and/or work together and cooperatively.

For the sake of clarity and simplicity, an example is used herein to illustrate the problem of incompatibility of non-native applications and non-interoperability between native and non-native applications. The non-native program modules are called 32-bit applications because they are designed to operate on a 32-bit platform. The native applications are called 64-bit applications because they are designed to operate on the native platform, which is 64-bit. This is provided as one example and not for limitation. Those of ordinary skill in the art understand and appreciate that there exists other combinations of native and non-native applications and native platforms.

Running Non-Native Applications on a Native Platform

Consider this: Running non-native applications on a native platform. More specifically, consider this example: Running 32-bit applications in a 64-bit environment. Assume, for this example, that the 64-bit platform is an upgrade to an existing popular 32-bit platform (on which the 32-bit applications are designed to run).

One advantage of a 64-bit platform over a 32-bit platform is that the much larger memory space can be addressed. 32-bit processors in a 32-bit platform can address about 2 GB of memory, but a 64-bit processors in a 64-bit platform can address terabytes of memory.

One of the problems with going from 32-bit platform to 64-bit platform is that the application programming interfaces (APIs) grow from 32-bit to 64-bit. Therefore, the new APIs deal with larger memory pointers, larger memory addressable space, etc. Thus, the 64-bit APIs are incompatible with calls from 32-bit applications. Thus, software developers need to recompile their applications to 64-bit and release a new version for the 64-bit platform. For many large end applications (particularly on servers), porting to 64-bit is the most appropriate alternative to take advantage of the new capabilities of a 64-bit OS. But for most applications, it is not best to port the application for numerous reasons, such as the sales projections for the 64-bit platform may not enough to justify the expense of porting, the application is very difficult to port, etc.

However, it is desirable to have the 32-bit applications operate and function correctly on a 64-bit platform. In other words, it is desirable to have a non-native (e.g., 32-bit) application run properly in a native (e.g., 64-bit) environment.

The capability of running 32-bit applications on the 64-bit platform is highly desirable for easing the transition from the popular 32-bit platform to the new 64-bit platform. Not only may this ease the transition, it may reduce the burden on software developers to immediately port their software to the 64-bit platform. It also gives the new 64-bit platform an existing library of software (e.g., the old 32-bit applications). Furthermore, it is desirable to have 32-bit and 64-bit applications interoperate.

Virtual Machine (VM)

In similar situations in the past, the solution has nearly always been to emulate the hardware on which the non-native applications would run. In other words, the native platform emulates the non-native hardware environment (such as a 32-bit processor) in which the non-native applications (such as 32-bit applications) run. Furthermore, the non-native OS (such as a 32-bit OS) run in the non-native hardware environment because the non-native applications need the non-native OS. This non-native hardware emulation is often called a "virtual machine" (VM) and the combination of the VM and the non-native OS is sometimes called the "box" or non-native OS "box" (e.g., a MS-DOS® box).

FIG. 2 illustrates the same multi-layered architecture of FIG. 1 except it includes a virtual machine 200. The VM emulates the non-native hardware layer 250 in software. To run non-native applications (such as 212a and 212b) within a VM, a non-native OS runs on top of the emulated non-native hardware layer 250. This non-native OS includes a user mode 210 and a kernel mode 230. Non-native APIs 220 are in the user mode 210 and a non-native kernel is in the kernel mode 230. As a result, these three layers (user mode, kernel mode, and hardware) are executed solely in software in a segregated "box" 200. There are other possible arrangements for a VM. For example, some or all of the VM components may be implemented within the native kernel 130.

Notice that the actual non-native kernel 230 is being executed within the VM 200. The non-native kernel 230 is not being emulated. Rather, it is running on top of an emulated hardware layer 250 of the VM 200.

Those of ordinary skill in the art understand the VM model. Although this model is very common, it is consume a large amount of resources and processing power (i.e., it is expensive). This is because it emulates a non-native hardware and executes the complete non-native OS on top of that emulated hardware. In addition, non-native applications operating within a VM box cannot interoperate ("interop") with native applications running within the native platform. Moreover, they cannot interoperate with other non-native applications running within other VMs. Thus, VM emulation is expensive and incompatible.

SUMMARY

Described herein is a technology facilitating the operation of non-native program modules within a native computing platform. This invention further generally relates to a technology facilitating the interoperability of native and non-native program modules within a native computing platform.

Specifically, this technology involves an emulation of the kernel of the non-native operating system. Instead of interacting with the native kernel of the native computing platform, the non-native program modules interact with a non-native kernel emulator. This emulator handles the necessary conversions and translations. With this non-native kernel emulation, native and non-native program modules are interoperable. Except for the kernel emulator, none of the program module (native or non-native) and none of the other portions of the native computing platform are aware of the emulation. The computing environment and other program modules appear to be non-native to the non-native program modules. Likewise, the non-native program modules appear to be native to the computing environment and the native program modules.

This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth specific embodiments of a kernel emulator for non-native program modules here that incorporate elements recited in the appended claims. These embodiments are described with specificity in order to meet statutory written description, enablement, and best-mode requirements. However, the description itself is not intended to limit the scope of this patent.

Described herein are one or more exemplary implementations of a method and system of fusing portions of a print medium. The inventors intend these exemplary implementations to be examples. The inventors do not intend these exemplary implementations to limit the scope of the claimed present invention. Rather, the inventors have contemplated that the claimed present invention might also be embodied and implemented in other ways, in conjunction with other present or future technologies.

An example of an embodiment of a kernel emulator for non-native program modules here may be referred to as an "exemplary kernel emulator."

Incorporation by Reference

This provisional application is incorporated by reference herein: U.S. Provisional Patent Application Ser. No. 60/244, 410, titled "Kernel Emulator for Non-Native Program Modules" filed on Oct. 30, 2000.

Introduction

Figure 6:
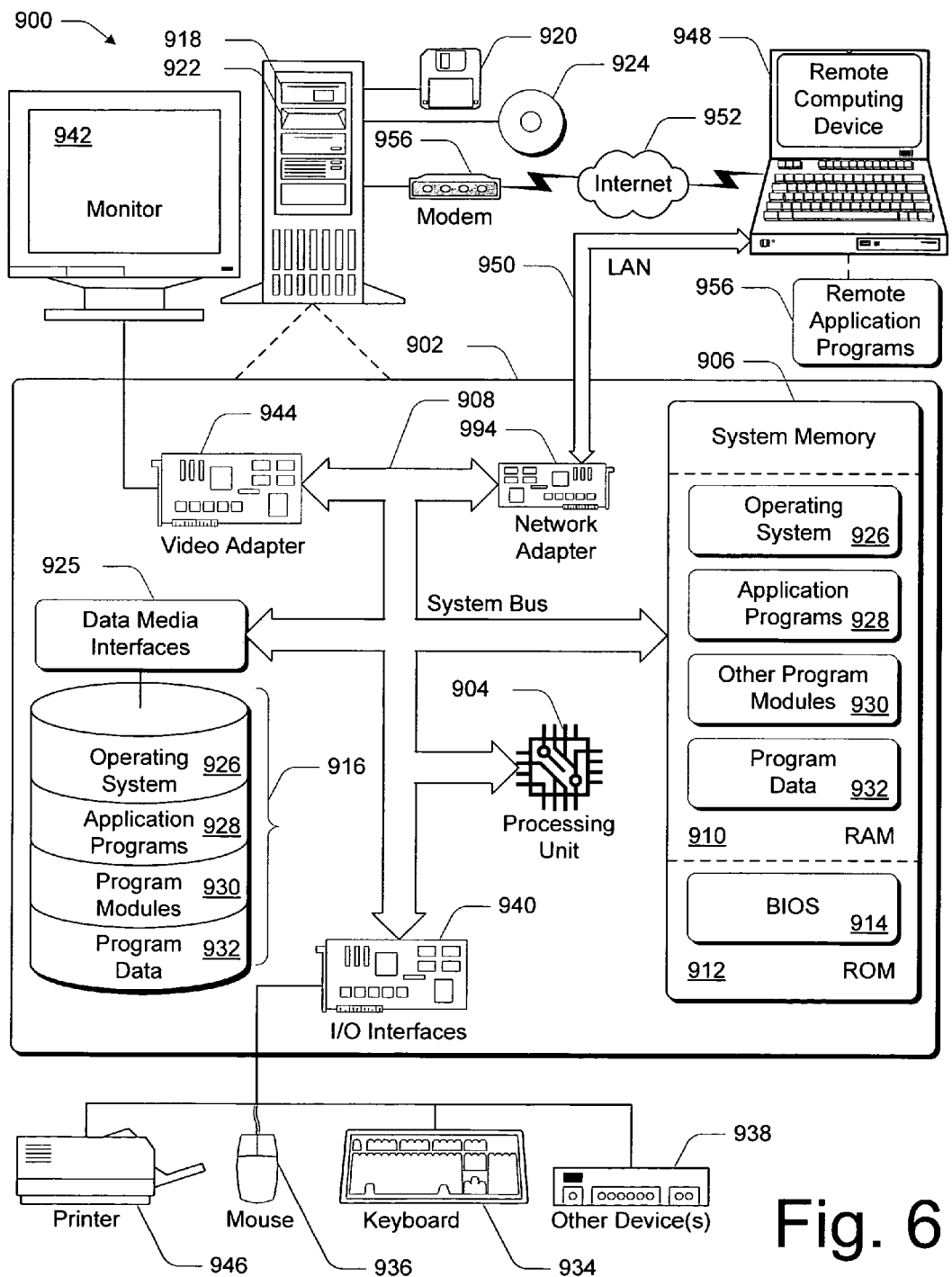
FIG. 6 is an example of a computing operating environment capable of implementing an implementation (wholly or partially) of the invention claimed herein.

The one or more exemplary implementations, described herein, of the exemplary kernel emulator may be implemented (whole or in part) by a kernel emulator 400 and/or by a computing environment like that shown in FIG. 6.

The exemplary kernel emulator, described herein, provides a mechanism with which non-native applications can be run on a native platform transparently. For instance, 32-bit applications can be run on 64-bit platform by using the exemplary kernel emulator.

This mechanism can also be used to plug-in a CPU simulator to broaden the scope. For example, the exemplary kernel emulator enables an application to run on a computer with a Merced processor where the application was written for x86 instruction set.

Using an exemplary implementation of the kernel emulator, the kernel of nearly any platform may be emulated and different CPU instructions can be simulated by plug-in CPU simulators.

Herein, references to "kernel emulation" mean emulation of a non-native kernel within the context of a native platform. Similarly, references, herein, to "kernel emulator" mean a non-native kernel emulator within the context of a native platform.

Overview of Kernel Emulation

As described in the above Background section, traditional solution for enabling non-native programs to operate on top of a native platform is virtual machine (VM). However, kernel emulation is less expensive than VMs. Less expensive in terms resources dedicated to emulation (e.g., resources include processor cycles, memory, overhead, etc.). Moreover, unlike VM emulation, all applications (including both native and non-native) may interoperate ("interop").

In this exemplary kernel emulation, described herein, the non-native applications believe that they are running on an operating system (OS) with their non-native kernel. Instead, their non-native kernel is being emulated. The non-native kernel emulator intercepts kernel calls made by the non-native applications and translates them into native kernel calls.

The exemplary kernel emulator is an emulator of the kernel of a non-native OS. It allows non-native applications to run within a native environment by emulating the non-native kernel of a non-native OS. The hardware is not emulated. Nor are the APIs. Instead, the kernel of the non-native OS is emulated. The emulated kernel translates non-native calls (from the applications and their APIs) into calls that can be interpreted and handled by the native OS. Moreover, the emulated kernel interprets and handles information flowing to the non-native applications from the native OS.

To accomplish this, an exemplary kernel emulator may perform one or more of the following functions:

translate hardware instruction set from non-native to native intercept kernel calls to convert from non-native memory addressing to native memory addressing constrain memory access of non-native applications to only the memory space addressable by such applications (e.g., the lower 2 GB of RAM). By doing so, the native memory manager need not be bothered with such constraints manage memory shared by both non-native and native applications accommodate a suitable CPU simulator that can be plugged in to simulate a variety of CPU architectures.

Computer Architecture Implementing Exemplary Kernel Emulator

Figure 1:
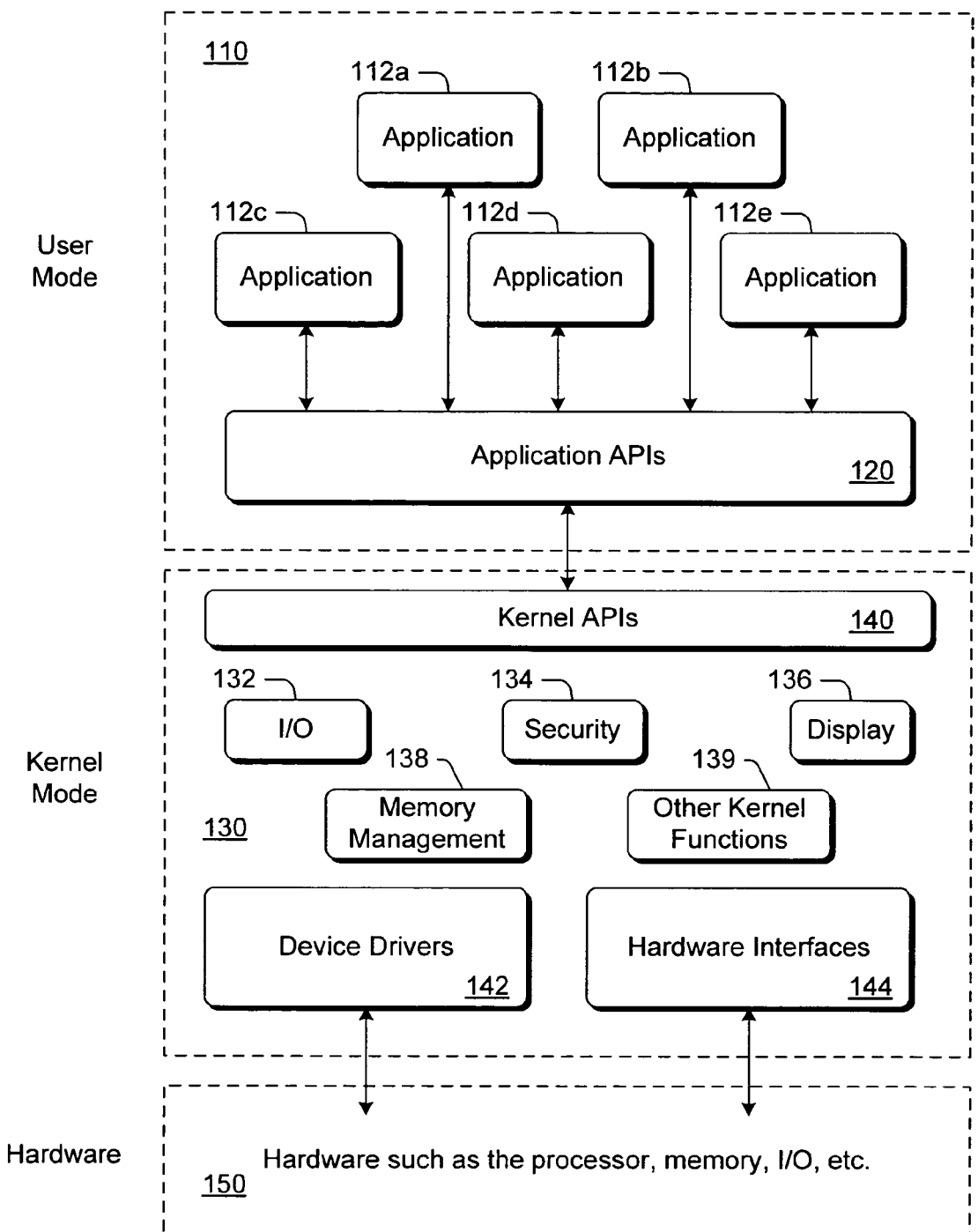
FIG. 1 is a schematic block diagram showing a computing architecture.
Figure 2:
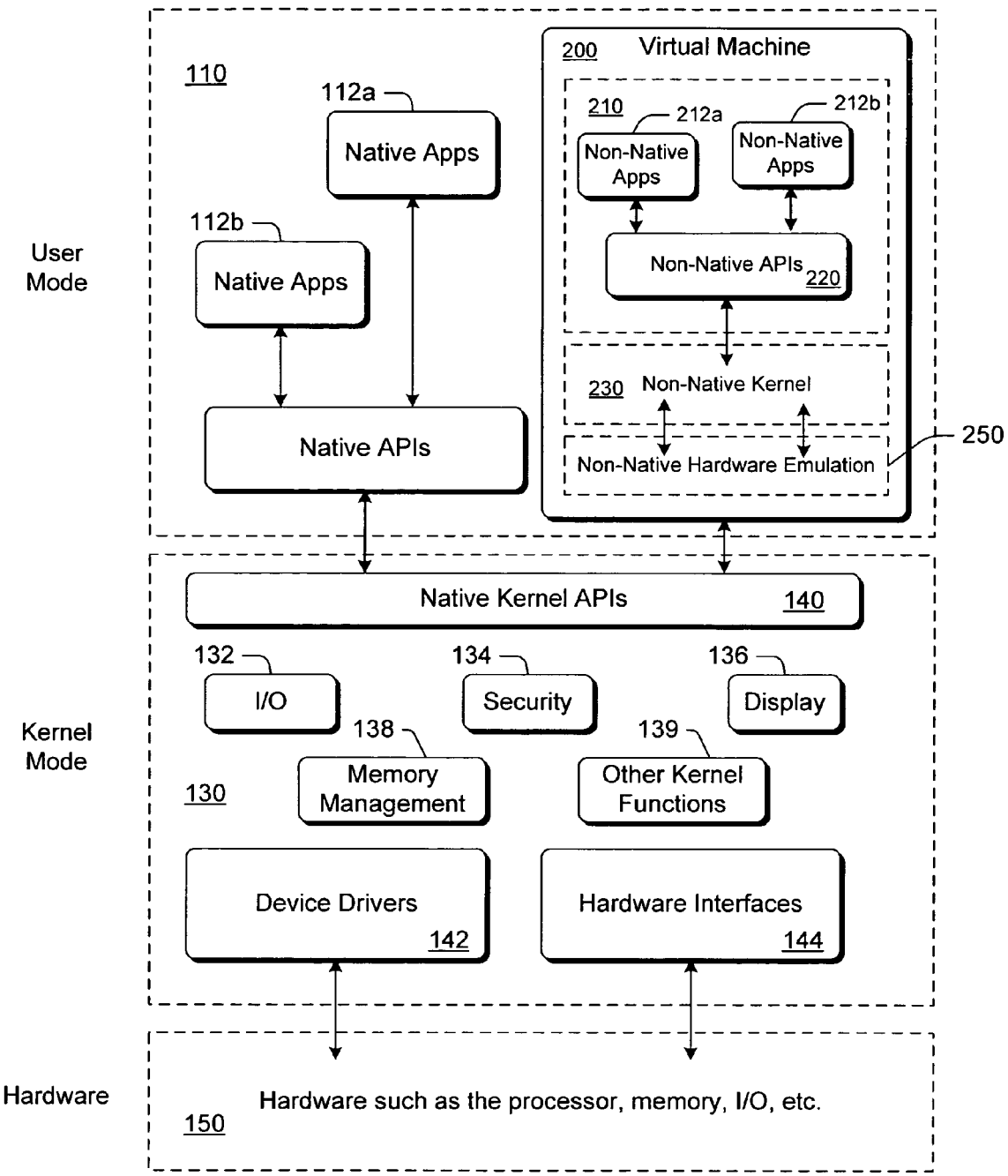
FIG. 2 is a schematic block diagram showing a computing architecture with an example of a virtual machine (VM) implementation.
Figure 3:
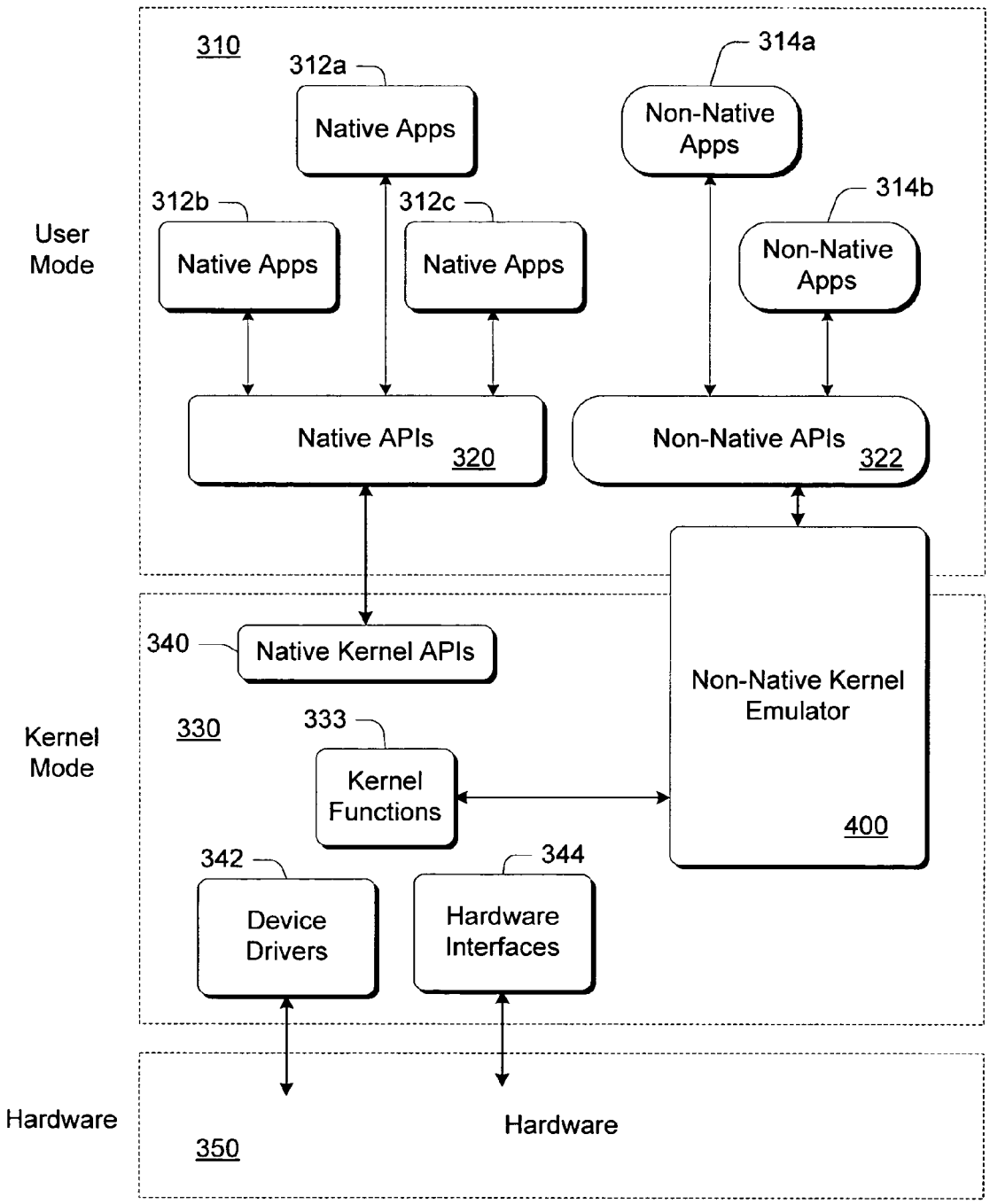
FIG. 3 is a schematic block diagram showing a computing architecture showing an embodiment in accordance with the invention claimed herein.

FIG. 3 illustrates a computer architecture 300 within which the exemplary kernel emulator may be implemented. The architecture includes a native platform, which includes hardware 350, kernel mode 330, and set of native APIs 320 of user mode 310. The top of the architecture 300 is the user mode 310. It includes applications. More specifically, it includes native applications (such as applications 312*a-c*) and non-native applications (such as applications 314*a* and 314*b*).

The native applications communicate with a set of native APIs 320. Typically, this native API set 320 is considered part of the native OS, and thus, part of the native computing platform. The non-native applications communicate with a set of non-native APIs 322. Typically, this non-native API set 320 is considered part of a non-native OS, and thus, the set is not part of the native computing platform.

Without the exemplary kernel emulation, the non-native applications (such as 314a and 314b) would not function. Why? They cannot call the native APIs 320 because they are unaware of them and because the native APIs are written to understand the instruction set and memory organization of the native platform, which are different from the instruction set and memory organization of the non-native platform expected by the non-native applications. In addition, if the non-native applications called their own non-native APIs 322, the non-native APIs would fail for the same reasons given above. Furthermore, the non-native APIs attempts to call the kernel APIs would call native kernel APIs 340. Such calls would not be understood by the native kernel APIs 340.

The non-native APIs 322 include "stub" code that directs their calls to a non-native kernel, which does not exist in the native platform. However, this "stub" code is the bridge between the "user mode" and the "kernel mode." In this exemplary kernel emulator, this stub code is modified so that it calls a non-native kernel emulator 400.

The next layer of the architecture 300 is the native kernel mode 330. This may be generally called the native "kernel" of the native OS. Since it is part of the native OS, it is part of the native computing platform.

This native kernel 330 includes the native kernel APIs 340 and various kernel functions 333, such as I/O, security, display control (i.e., access to the screen), memory management, and other privileged functions. The native kernel 330 has sole access to the hardware in the hardware layer 350 via device drivers 342 and other hardware interfaces 344. Native kernels APIs 340 are those APIs within the kernel that arbitrate access to the kernel functions.

Although FIG. 3 does not show the components 333-344 of the kernel 330 with connections between them, these components are connected as is necessary. The coupling lines are omitted from the drawing for the sake of simplicity and clarity.

Below the kernel mode 330, there is the hardware layer 350. This layer includes all of the hardware of the actual computer. This includes the processor(s), memory, disk I/O, other I/O, etc. The native platform also includes the hardware layer.

Therefore, native computing platform includes the hardware layer 350, the kernel layer 330, and typically the user-mode native APIs 320. The native platform does not include the non-native APIs 322 or the non-native kernel emulator 400.

Exemplary Kernel Emulator

As shown in FIG. 3, the non-native kernel emulator 400 is part of both the user layer of the user mode 310 and the kernel layer of the native kernel mode 330. Consequently, portions of the non-native kernel emulator 400 may operate primarily in the user layer and others may operate primarily in the kernel layer. Alternatively, the non-native kernel emulator 400 may be part of just the kernel layer. The non-native kernel emulator 400 communicates with non-native APIs 332, the native kernel, and directly with the memory of the hardware layer 350.

Although FIG. 3 shows the non-native kernel emulator 400 within the kernel mode layer, it may be implemented in the user mode layer in alternative embodiments. It may also be implemented partially in the user mode and partially in the kernel mode.

Figure 4:
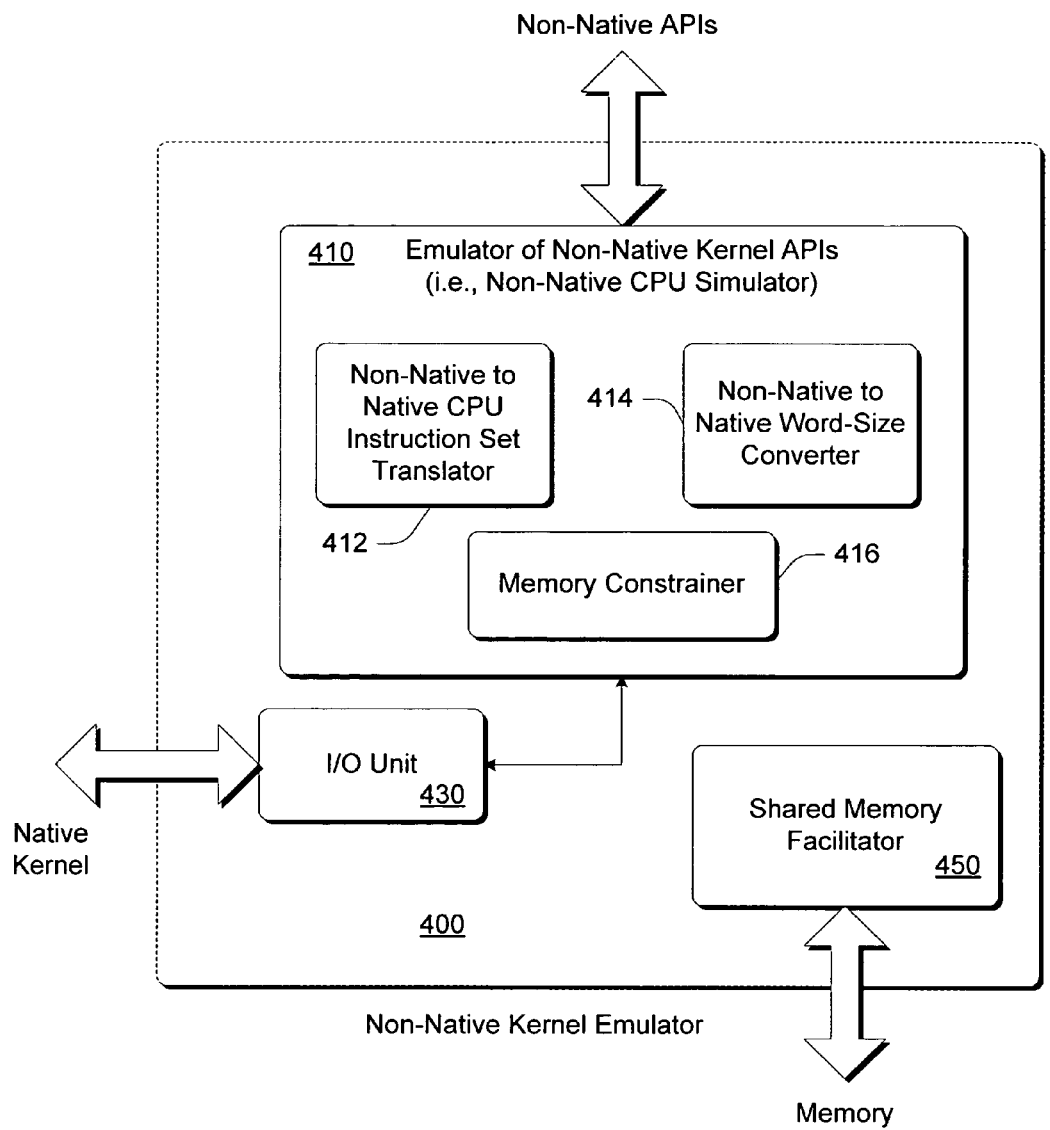
FIG. 4 is a schematic block diagram of a kernel emulator in accordance with the invention claimed herein.

FIG. 4 illustrates the non-native kernel emulator 400, which is an implementation of the exemplary kernel emulator. It includes an emulator 410 of non-native kernel APIs, which may also be called the non-native CPU simulator (or simply the "CPU simulator). To avoid confusion with nomenclature, this will be called CPU simulator 410.

Although this name seems to imply hardware emulation, the hardware is not being emulated by the CPU simulator 410 or by any other portion of the non-native kernel emulator 400. As discussed in the Background section, the OS is inextricably linked to the hardware (included the CPU). Therefore, the native and non-native hardware is a major consideration in non-native kernel emulation. Those of ordinary skill in the art see and understand that this CPU simulation is fundamentally different from an emulation of hardware (like in the VM model).

The exemplary kernel emulator may have CPU simulators for different platforms. The exemplary kernel emulator finds a CPU simulator for the target CPU architecture (of the non-native application) and uses for its kernel emulation.

The CPU simulator 410 includes a translator 412 for translating non-native to native CPU instructions sets, a converter 414 for converting non-native to native word sizes, and a memory constrainer 416 to limit the memory accessible to non-native applications to that which such applications are capable of addressing.

In the exemplary implementation, the translator 412 and converter 414 operate primarily within the user mode. The advantage to running them in user mode is that bugs in that code will crash only the user-mode process. If code running in kernel mode crashes, it will likely crash the entire machine.

Calls to the Kernel by Non-Native Applications

The CPU simulator 410 receives the kernel calls from non-native applications. More specifically, the CPU simulator 410 receives the kernel calls from non-native APIs.

The kernel emulator 400 does not perform the functions of a kernel. Rather, it translates the non-native calls from their non-native format to a native format. It then passes the translated calls onto the native kernel for the native kernel to process as if the call was from a native application. However, to do this may involve more than a simply translation of a language. It may involve a conversion of paradigms between the non-native and native platforms.

For example, within a 32-bit platform (such as Microsoft® Windows® 98 and an x86 instruction-set processor), when an application wants to make a kernel API call, it pushes its arguments onto a stack (within memory). The arguments sit in memory. If the application wants to call an API and pass it "3" and a pointer to a string of text, then the application writes "3" to the memory (onto the stack) and then writes the address of the string to memory, as well. The API can read these values from memory to pick up the arguments when the API is executed.

Continuing the example, on a 64-bit platform (such as a 64-bit OS and an Intel® Itanium™ processor), argument values are passed within the CPU itself More specifically, the argument values are passed within the registers of the CPU. Instead of an application storing the argument values in a stack (i.e., memory), it stores them in CPU registers.

The translator 412 performs instruction emulation. It handles the emulation of the non-native processor's instruction set.

The converter 414 manages both argument format and word size. It changes the argument format from non-native to native and changes the word size from non-native to native.

Together, the translator 412 and converter 414 manage the argument-passing-via-stack convention of the 32-bit platform to the argument-passing-via-registers convention of the 64-bit platform. This is an example of a paradigm change in how argument values are passed. The CPU simulator 410 accounts for this change with its translation of the CPU instruction set by translator 412.

In another example, in a 32-bit platform, the word size is 32 bits long. Thus, addresses and data are typically written in 32-bit sized words in memory. In a 64-bit platform, the word size is 64 bits long. Thus, addresses and data are typically written in 64-bit sized words in memory.

Parameters (i.e., arguments) are typically one word long. Therefore, the parameters for the 64-bit kernel APIs are 64-bits long; rather than 32-bits long for the 32-bit kernel APIs.

The converter stretches the 32-bit arguments passed by the non-native applications (and APIs) from 32-bits to 64-bits. One example of how it does this by padding the argument with 32 leading zeroes. In the exemplary implementation, the converter 414 operates primarily within the user layer.

The exemplary kernel emulator, described herein, assumes that the word size for the non-native platform is smaller than the addressable memory space for the native platform. In an alternative embodiment, this assumption may be reversed. Those of ordinary skill in the art understand that this would a reversal of the techniques described herein.

As discussed above, differing platforms typically have differing word sizes. Consequently, the size of the addressable memory space differs, as well. Therefore, the converter 414 converts the addresses (in particular, pointers) as part of its word conversion.

For instance, the memory addresses of a 32-bit platform may be up to 32-bits long; thus, the maximum addressable memory is approximately 4 GB (if one of the bits is reserved, then the maximum is about 2 GB). The memory addresses of a 64-bit platform may be up to 64-bits long; thus, the maximum addressable memory is measured in terabytes. Thus, the size of addressable memory differs between the 32-bit and 64-bit platforms.

Constraining Memory for Non-Native Applications

The native OS is unaware that non-native applications are non-native. Each non-native application appears to be a native process because the kernel emulator 400 presents it to the native OS (specifically, the kernel) as a native application.

Native applications can access the full range of addressable memory. However, non-native applications cannot. Instead, they are limited to a subset of memory available to a native application. For example, a 32-bit application is forced to operate within the lower 2 GB of the terabytes of potential memory space allocated to a native application.

Since the native memory manager is unaware of a distinction between native and non-native applications, the memory constrainer 416 of the non-native kernel emulator 400 forces this limitation.

When a non-native application requests a memory workspace, this request goes through the kernel emulator 400 rather than the native kernel. The memory constrainer 416 of the kernel emulator 400 reserves all of the available memory except for the lower portion. This unreserved portion matches the memory space addressable by the non-native application. This unreserved portion is available for the non-native application operating within.

For example, if non-native applications can only address a maximum of 2 GB and if 8 TB (terabytes) are allocated to typical native application, then the memory constrainer 416 will reserves all of the memory from 2 GB to 8 TB. That reserved memory is unavailable to the non-native applications. When the native memory manager allocates memory for the non-native applications, it will allocate memory from the lower 2 GB range.

Continuing with this example, when a non-native application wants memory, it calls the kernel emulator 400, and the emulator calls the native memory manager. The native memory manager allocates memory from the lower 2 GB because that is all that is available. The native memory manager is unaware that unaware that the application seeking the memory is non-native. The manager need not know because the emulator 400 assures that the manager can only allocate memory within the proper range for the non-native application.

Intercepting Kernel Calls

Applications do not typically call the kernel directly. Rather, the applications call the APIs, which in turn, call the kernel.

With the exemplary kernel emulator, the non-native APIs call the kernel emulator 400 rather than calling the actual native kernel. The kernel emulator understands the calls from the non-native APIs and it is designed to handle them. As described above, it converts the non-native API calls into native calls to the actual native kernel.

Instruction Set Translation

The native and non-native platforms typically have differing CPU instruction sets. For example, the instruction set for an x86-based hardware is different from the instruction set for the Intel® Itanium™ hardware. A different instruction set implies a different machine code; a different assembly language; and often there are different operational paradigms.

The translator 412 of the kernel emulator 400 of FIG. 4 translates non-native CPU instruction sets to native CPU instruction sets. In the exemplary implementation, the translator 412 operates primarily within the user layer.

When comparing the instructions of any one CPU instruction set to that of another CPU instruction set, many of the instructions are functionally similar if not identical. It may take multiple instructions in one set to accomplish the same task as one instruction in another task. Nevertheless, most instructions in one set can be translated into instructions in another set.

Communication with the Native Kernel

FIG. 4 shows that the non-native kernel emulator 400 also includes an I/O unit 430 for communicating with the native kernel. Via the I/O unit, converted kernel calls are sent to the native kernel, memory allocation requests are made to the native kernel, and all other communication to the native kernel is performed. In addition, communication from the native kernel is received by the I/O unit.

Shared Memory

As shown in FIG. 4, the non-native kernel emulator 400 includes a shared memory facilitator 450 coordinate memory sharing between native and non-native applications. In the exemplary implementation, the shared memory facilitator 450 operates primarily within the user layer.

Although they run in separate allocated memory spaces, some native applications actually share memory between processes. In other words, applications running in their own isolated memory space share some of the memory (even when they have different addresses) with other applications so that the same memory is visible within multiple processes. For example, when an application writes a value into the memory within its own address space, it instantly appears in the memory space of a separate application. And vice versa. This is a high performance technique for applications to share data since it need only be written once, but it appears to and is instantly available to multiple applications.

An example of data that is shared across multiple applications in a 32-bit OS (like Microsoft® Windows® 98) includes a list of open windows (titles and position).

The key problem with the shared memory for non-native applications is that the content of the shared memory often includes pointers. The native applications use native memory addressing (e.g., 64-bit long addresses) and thus, read and write in the native addressing in the shared memory. However, the non-native applications don't understand the native addressing because they expect their non-native format (e.g., 32-bit long addresses).

One approach to solving this problem is to redesign some of the APIs so that it is aware that it is using shared memory. Thus, the APIs know how to read and write memory using native addressing format.

Another approach, and the one implemented by the shared memory facilitator 450, is to make copies of the shared memory. Thus, the original is in a native addressing format and the copy is in non-native addressing format. The two versions are regularly synchronized. This is done for the TEBs and PEBs structures.

An example of a "process" includes the abstraction of environment to execute instruction in the target application to get some job done. Process control block or process environment block (PEB) may have necessary information to describe the process in the native platform and in the target environment. A PEB may be generically called a process shared data structure (SDS).

The PEB is a fixed-formatted structure of memory that each process has containing environmental information about the process, such as such as command line for the process, info about what files it has open, its position on the display, and the like.

The format of the PEB for native applications is different from the format for non-native applications. In the kernel emulation, there are two PEBs per application—a native PEB and a non-native PEB. This includes both native and non-native applications. Whenever a non-native application attempts to access the PEB, it accesses the non-native version. Whenever the native kernel attempts to access the PEB, it accesses the native version. These two versions are regularly synchronized. The address conversion (between native and non-native addressing formats) is done during the synchronization.

An example of a "thread" includes a path of execution within a process. Thread control block or thread environment block (TEB) may have the necessary information to describe a thread in the host and in the target environment. A TEB may be generically called a thread shared data structure (SDS).

The TEB is similar to the PEB. It is a fixed-formatted structure of memory that stores information about a thread running inside of a process, such as last error value from an API call, pointer to the stack for the thread, and the like. Each thread has a TEB structure associated with it.

Similarly to the PEB, the format of the TEB for native applications is different from the format for non-native applications. In the kernel emulation, there are two TEBs per thread—a native TEB and a non-native TEB. This includes both native and non-native applications. Whenever a non-native application attempts to access the TEB, it accesses the non-native version. Whenever the native kernel attempts to access the TEB, it accesses the native version. These two versions are regularly synchronized. The address conversion (between native and non-native addressing formats) is done during the synchronization.

Methodological Implementation of the Exemplary Kernel Emulator

Figure 5A:
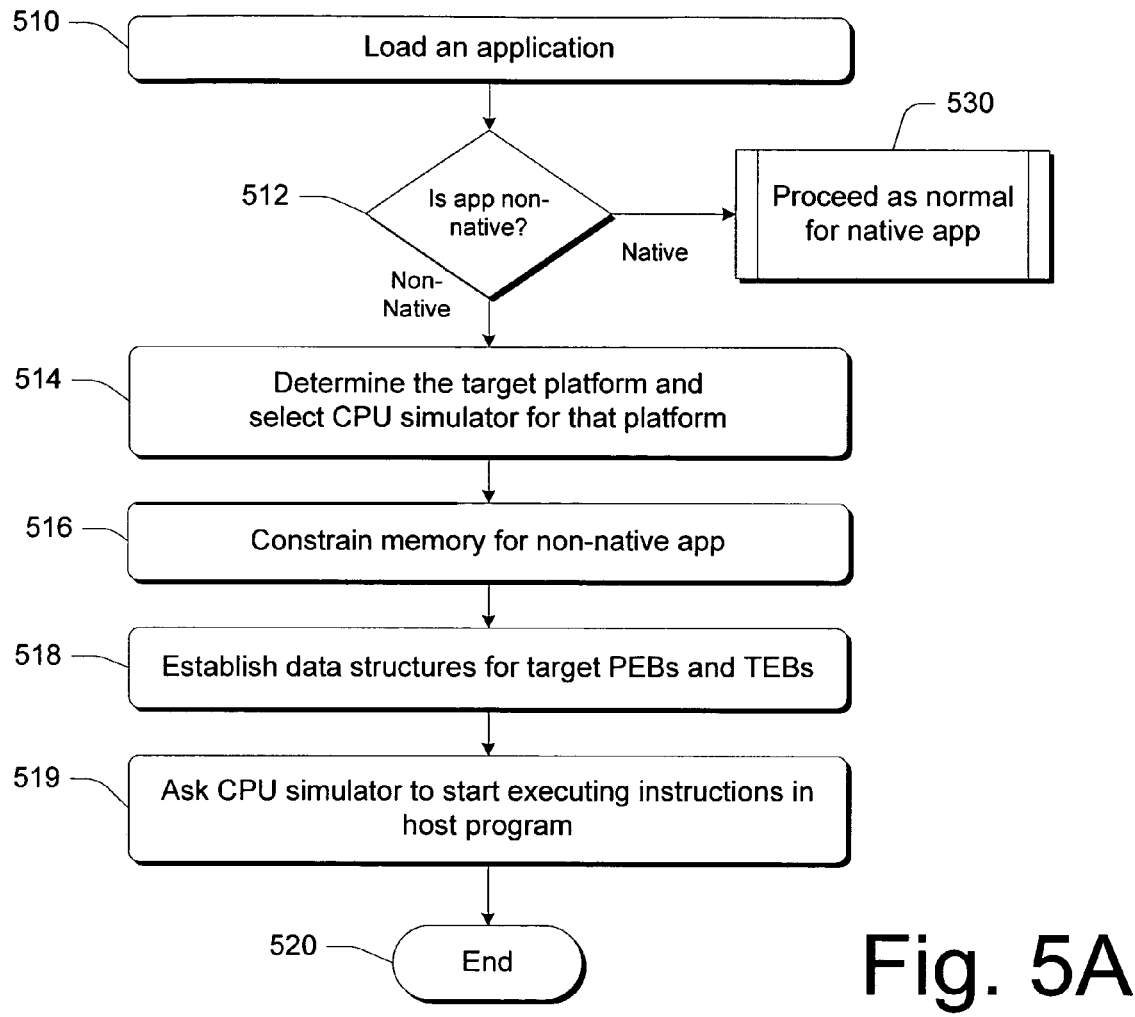
FIG. 5 is a flow diagram showing a methodological implementation of the invention claimed herein.

FIG. 5A shows methodological implementation of the exemplary kernel emulator performed by the kernel emulator 400 (or some portion thereof). This methodological implementation may be performed in software, hardware, or a combination thereof.

At 510 of FIG. 5, an application is loaded (i.e., initialized). At 512, if the application is determined to be a native application, then is processed as normal, at 530, by the OS. At 512, if the application is determined to be a non-native application, then, at 514, it is determined the target (i.e., non-native) platform and the CPU simulator for that platform is selected and implemented. Alternatively, steps 512 and 514 are unnecessary when the target platform may be fixed.

Figure 5B:
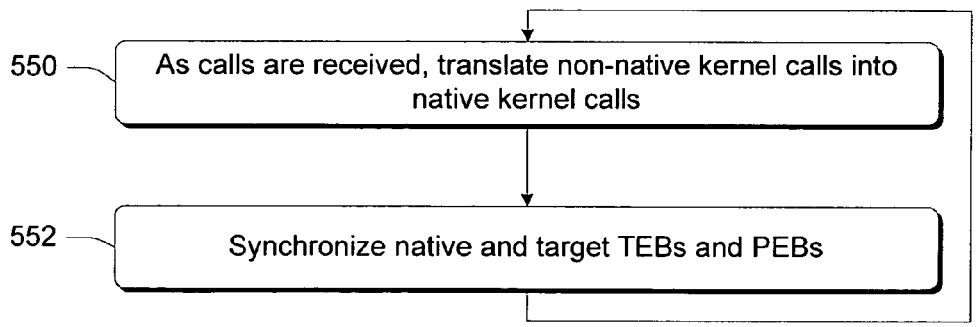

At 516 of FIG. 5A, the exemplary kernel emulator constrains the memory to that which is addressable by the non-native application. At 518, the exemplary kernel emulator establishes data structures, which are copies of the PEBs and TEBs, but they are in a non-native format. At 519, the exemplary kernel emulator asks the CPU simulator to start executing instructions in host program. At 520, this method of initiating a non-native application ends. The non-native application continues to run. FIG. 5B illustrates the steps performed by the kernel emulation while the non-native application is running.

FIG. 5B shows methodological implementation of the exemplary kernel emulator performed by the kernel emulator 400 (or some portion thereof). This methodological implementation may be performed in software, hardware, or a combination thereof.

At 550 of FIG. 5B, the exemplary kernel emulator translates the calls to a non-native kernel into calls to a native kernel. It does so, for example, in the manner described herein. It translates platform paradigms and CPU instruction sets. It converts word sizes—including converting addresses.

At 560, the exemplary kernel emulator synchronizes the native and non-native TEBs and PEBs. The exemplary kernel emulator continues to do these steps as long as the non-native application executes.

Additional Details

In general, while attempting to run an application, a loader creates a native process using that application and transfers control of execution to some entry point in the process. It creates the PEB and the TEB for the initial thread. The loader is the part of the OS that initializes an application for it to run.

While creating the native process, the loader checks the type of application. If the type of application is not native, it instead creates the kernel emulator process (kernel-emu-process) and transfers the control to the entry point in kernel-emu-process. The kernel-emu-process is designed in such a way that non-native applications feel that it's running in the native environment it was written for. Therefore, exemplary kernel emulator provides a synthesized non-native platform for the non-native application. Whenever non-native applications need to communicate with the OS, kernel-emu-process just proxies that request. The native platform is happy because it thinks its running a native process, because kernel-emu-process don't violate any constraint may required native processes.

At the time of loading a non-native application, exemplary kernel emulator creates the necessary environment for the application so that other programs running in the host machine can identify this process as if a native application is running. The exemplary kernel emulator also creates the necessary environment for the target platform inside the host (i.e., native platform) so that the running application feels that it's running in the native platform.

When creating a kernel-emu-process, the shared memory facilitator 450 generates a target (i.e., non-native) Process Environment Block (target PEB) and native kernel generates a native PEB. There is some mapping between the native PEB and the target PEB. In the same way, the shared memory facilitator 450 generates a target (i.e., non-native) Thread Environment Block (target TEB) and native kernel generates a native TEB appropriate for the running a thread in the process. There is some mapping between the native TEB and the target TEB.

Other native processes may get information from the native PEB and TEB while querying for a kernel-emu-process and thread. The native PEB and TEB in a kernel-emu-process work as a proxy.

If there are any other necessary environment settings, exemplary kernel emulator may create a version for the target and keep some mappings between the two.

Exemplary Computing System and Environment

FIG. 6 illustrates an example of a suitable computing environment 900 within which an exemplary kernel emulator, as described herein, may be implemented (either fully or partially). The computing environment 900 may be utilized in the computer and network architectures described herein.

The exemplary computing environment 900 is only one example of a computing environment and is not intended to suggest any limitation as to the scope of use or functionality of the computer and network architectures. Neither should the computing environment 900 be interpreted as having any dependency or requirement relating to any one or combination of components illustrated in the exemplary computing environment 900.

The exemplary kernel emulator may be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Exemplary kernel emulator may be described in the general context of computer-executable instructions, such as program modules, being executed by a computer. Generally, program modules include routines, programs, objects, components, data structures, etc. that perform particular tasks or implement particular abstract data types. Exemplary kernel emulator may also be practiced in distributed computing environments where tasks are performed by remote processing devices that are linked through a communications network. In a distributed computing environment, program modules may be located in both local and remote computer storage media including memory storage devices.

The computing environment 900 includes a general-purpose computing device in the form of a computer 902. The components of computer 902 can include, by are not limited to, one or more processors or processing units 904, a system memory 906, and a system bus 908 that couples various system components including the processor 904 to the system memory 906.

The system bus 908 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 902 typically includes a variety of computer readable media. Such media can be any available media that is accessible by computer 902 and includes both volatile and non-volatile media, removable and non-removable media.

The system memory 906 includes computer readable media in the form of volatile memory, such as random access memory (RAM) 910, and/or non-volatile memory, such as read only memory (ROM) 912. A basic input/output system (BIOS) 914, containing the basic routines that help to transfer information between elements within computer 902, such as during start-up, is stored in ROM 912. RAM 910 typically contains data and/or program modules that are immediately accessible to and/or presently operated on by the processing unit 904.

Computer 902 may also include other removable/non-removable, volatile/non-volatile computer storage media. By way of example, FIG. 6 illustrates a hard disk drive 916 for reading from and writing to a non-removable, non-volatile magnetic media (not shown), a magnetic disk drive 918 for reading from and writing to a removable, non-volatile magnetic disk 920 (e.g., a "floppy disk"), and an optical disk drive 922 for reading from and/or writing to a removable, non-volatile optical disk 924 such as a CD-ROM, DVD-ROM, or other optical media. The hard disk drive 916, magnetic disk drive 918, and optical disk drive 922 are each connected to the system bus 908 by one or more data media interfaces 925. Alternatively, the hard disk drive 916, magnetic disk drive 918, and optical disk drive 922 can be connected to the system bus 908 by one or more interfaces (not shown).

The disk drives and their associated computer-readable media provide non-volatile storage of computer readable instructions, data structures, program modules, and other data for computer 902. Although the example illustrates a hard disk 916, a removable magnetic disk 920, and a removable optical disk 924, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 916, magnetic disk 920, optical disk 924, ROM 912, and/or RAM 910, including by way of example, an operating system 926, one or more application programs 928, other program modules 930, and program data 932. Each of such operating system 926, one or more application programs 928, other program modules 930, and program data 932 (or some combination thereof) may include an embodiment of an interceptor, a call-converter, an argument converter, a translator, a shared-memory manager, an instruction-translator, an address-translator, a memory constrainer, a target-platform determiner, an instruction-type detector, a translator selector, a target-platform simulator.

A user can enter commands and information into computer 902 via input devices such as a keyboard 934 and a pointing device 936 (e.g., a "mouse"). Other input devices 938 (not shown specifically) may include a microphone, joystick, game pad, satellite dish, serial port, scanner, and/or the like. These and other input devices are connected to the processing unit 904 via input/output interfaces 940 that are coupled to the system bus 908, but may be connected by other interface and bus structures, such as a parallel port, game port, or a universal serial bus (USB).

A monitor 942 or other type of display device can also be connected to the system bus 908 via an interface, such as a video adapter 944. In addition to the monitor 942, other output peripheral devices can include components such as speakers (not shown) and a printer 946 which can be connected to computer 902 via the input/output interfaces 940.

Computer 902 can operate in a networked environment using logical connections to one or more remote computers, such as a remote computing device 948. By way of example, the remote computing device 948 can be a personal computer, portable computer, a server, a router, a network computer, a peer device or other common network node, and the like. The remote computing device 948 is illustrated as a portable computer that can include many or all of the elements and features described herein relative to computer 902.

Logical connections between computer 902 and the remote computer 948 are depicted as a local area network (LAN) 950 and a general wide area network (WAN) 952. Such networking environments are commonplace in offices, enterprise-wide computer networks, intranets, and the Internet.

When implemented in a LAN networking environment, the computer 902 is connected to a local network 950 via a network interface or adapter 954. When implemented in a WAN networking environment, the computer 902 typically includes a modem 956 or other means for establishing communications over the wide network 952. The modem 956, which can be internal or external to computer 902, can be connected to the system bus 908 via the input/output interfaces 940 or other appropriate mechanisms. It is to be appreciated that the illustrated network connections are exemplary and that other means of establishing communication link(s) between the computers 902 and 948 can be employed.

In a networked environment, such as that illustrated with computing environment 900, program modules depicted relative to the computer 902, or portions thereof, may be stored in a remote memory storage device. By way of example, remote application programs 958 reside on a memory device of remote computer 948. For purposes of illustration, application programs and other executable program components such as the operating system are illustrated herein as discrete blocks, although it is recognized that such programs and components reside at various times in different storage components of the computing device 902, and are executed by the data processor(s) of the computer.

Computer-Executable Instructions

An implementation of an exemplary kernel emulator may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Exemplary Operating Environment

FIG. 6 illustrates an example of a suitable operating environment 900 in which an exemplary kernel emulator may be implemented. Specifically, the exemplary kernel emulator(s) described herein may be implemented (wholly or in part) by any program modules 928-930 and/or operating system 926 in FIG. 6 or a portion thereof.

The operating environment is only an example of a suitable operating environment and is not intended to suggest any limitation as to the scope or use of functionality of the exemplary kernel emulator(s) described herein. Other well known computing systems, environments, and/or configurations that are suitable for use include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer Readable Media

An implementation of an exemplary kernel emulator may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. A processor coupled to a computer memory, the processor configured to:
   determine a target platform of a non-native program module, the non-native program module having non-native instructions associated therewith, determine the type of non-native instructions and CPU simulator of a non-native kernel emulator associated with the target platform, constrain the memory addressable by the non-native program module such that the non-native program module may only address a portion of the memory, wherein the processor is further configured to establish data structures for target process environment blocks (PEBs) and target thread environment block (TEBs), the target PEBs and TEBs being in a format of the non-native program module, and further synchronize native and target TEBs and PEBs, and execute the non-native instructions by translating at least one of the non-native instructions into a corresponding native instruction by the non-native kernel emulator, and kernel communicating the corresponding native instruction to a native kernel by the non-native kernel emulator so that kernel calls from the non-native program module are dynamically converted into native kernel calls.

2. A computer storage medium having computer executable instructions that, when executed by a computer, cause the computer to perform a method, the method comprising:

determining a target kernel platform of a non-native program module, the non-native program module having non-native instructions associated therewith, determining the type of non-native instructions that the non-native program module employs and a CPU simulator of a non-native kernel emulator associated with the target platform, constraining memory addressable by the non-native program module such that the non-native program module may only address a portion of the memory, establishing data structures for target process environment blocks (PEBs) and target thread environment block (TEBs), the target PEBs and TEBs being in a format of the non-native program module, and further synchronizing native and target TEBs and PEBs, executing the non-native instructions by translating the non-native instructions into native instructions by the non-native kernel emulator, and communicating the native instruction to a native kernel by the non-native kernel emulator so that kernel calls from a non-native program module are dynamically converted into native kernel calls.

3. One or more computer storage media having computer-executable instructions that, when executed by a computer, cause the computer to perform kernel emulation acts for non-native program modules, the acts comprising:

determining a target platform of a non-native program module, the non-native program module having non-native instructions associated therewith, wherein the determining act comprises:

determining the type of non-native instructions and a target kernel that the non-native program module employs and a CPU simulator of a non-native kernel emulator associated with the target platform;

constraining memory addressable by the non-native program module such that the non-native program module may only address a portion of the memory, establishing data structures for target process environment blocks (PEBs) and target thread environment block (TEBs), the target PEBs and TEBs being in a format of the non-native program module, and further synchronizing native and target TEBs and PEBs, executing the non-native instructions; and translating the non-native instructions into native instructions by the non-native kernel emulator and communicating the native instructions to a native kernel by the non-native kernel emulator whereby kernel calls from the non-native program module are dynamically converted into native kernel calls.

4. The processor as recited in claim 1, wherein the remaining portion of the memory is addressable by a native program module.

5. The method as recited in claim 2, wherein the remaining portion of the memory is addressable by a native program module.

6. The acts as recited in claim 3, wherein the remaining portion of the memory is addressable by a native program module.

* * * * *